United States Patent [19]
Fitterer et al.

[11] 3,843,035
[45] Oct. 22, 1974

[54] GUIDE ELEMENT FOR MAGNETIC TAPES

[75] Inventors: Horst Fitterer, Heidelberg; Karl Uhl, Frankenthal; Friedrich Guenther, Willstaett; Kurt Scmidts, Kehl; Dieter Gaiser, Diersheim, all of Germany

[73] Assignee: Badische Anilin- & Soda-Fabrik Aktiengesellschaft, Ludwigshafen/Rhein, Germany

[22] Filed: Jan. 18, 1973

[21] Appl. No.: 324,675

[52] U.S. Cl. .................... 226/195, 226/196, 242/76, 242/199

[51] Int. Cl. ............................................ B65h 23/08

[58] Field of Search ...... 226/196, 195; 242/76, 197, 242/199, 200

[56] References Cited

UNITED STATES PATENTS

| | | | |
|---|---|---|---|
| 2,105,254 | 1/1938 | Martin | 242/76 |
| 3,033,074 | 5/1962 | Schaefer | 242/76 UX |

*Primary Examiner*—Richard A. Schacher
*Attorney, Agent, or Firm*—Johnston, Keil, Thompson & Shurtleff

[57] ABSTRACT

Guide elements for magnetic tapes, particularly for tapes in magnetic tape cartridges, having a guide surface with a specific roughness so that adhesion between the tape base and the guide surface which preferably consists of plastics material cannot occur. Undisturbed tape travel is thus achieved in a simple manner.

8 Claims, 9 Drawing Figures

GUIDE ELEMENT FOR MAGNETIC TAPES

The present invention relates to guide elements for magnetic tapes, particularly for tapes in magnetic tape cartridges, the said elements consisting of non-magnetizable material.

Fixed tape guide pins and elements having guide surfaces for use in magnetic tape cartridges and with which the tape is in contact some or all of the time when the recorder is operated are already known. Movable guide elements with guide surfaces for the turns of tape approaching and leaving the tape packs are known from U.S. Patent application Ser. No. 208,704. These guide elements are for example in the form of pivotally mounted levers with guide surfaces which are arranged near the periphery of each pack in such a way that they are constantly in contact with tape base when the tape is in motion. Such tape guide elements can also be used for example on studio tape recorders employing flangeless spools.

Generally speaking, the abovementioned types of guide elements which cannot rotate freely about an axis but which are fixed or whose movement is restricted can be employed on all kinds of recording and reproducing machines using either flanged or flangeless spools.

It has been found particularly when the spools accelerate from standstill and even when tape is in motion that the tape suddenly stops or becomes slower, particularly in the case of compact cassettes, as a result of the tape adhering to the guide surfaces of such tape guide elements.

An object of the invention is to prevent or reduce adhesion between the guide surface and the magnetic tape so that undisturbed tape travel is achieved.

Another object of the invention is to eliminate the problem of adhesion with simple means.

A further object of the invention is to so shape the guide elements during their manufacture that during the life of the element adhesion between guide surface and magnetic tape cannot occur regardless of the materials concerned and their frictional properties.

Yet another object of the invention is to so design the guide surface of the guide element that the effective area in contact with the tape is reduced to such an extent that friction is so decreased that the buildup of static electricity can scarcely occur.

Figure 1:
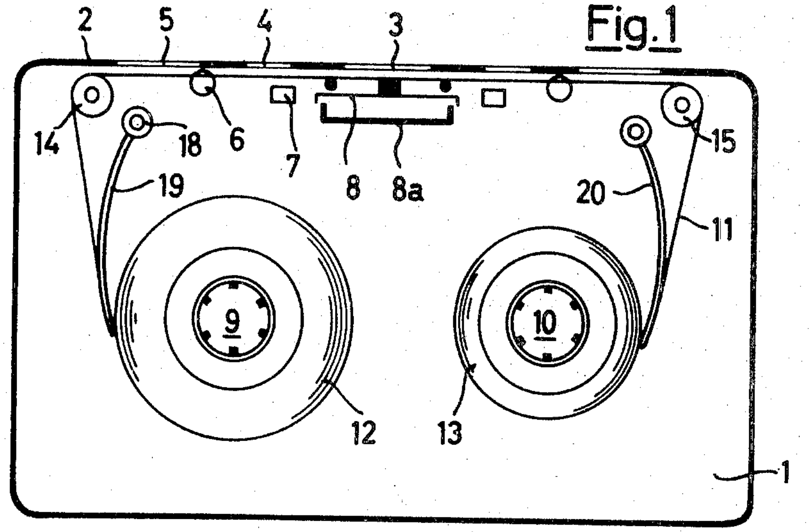
Figure 2:
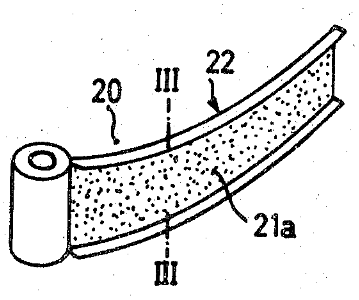
Figure 4A:
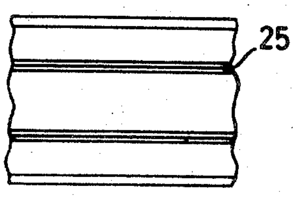
Figure 4B:
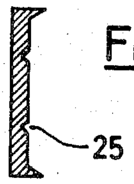
Figure 5A:
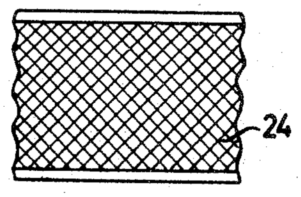
Figure 5B:
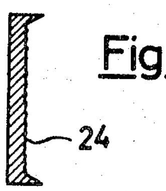
Figure 3A:
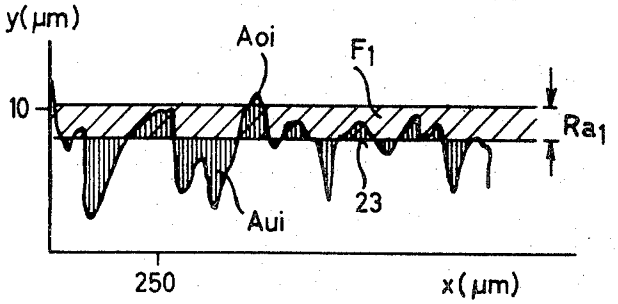
Figure 3B:
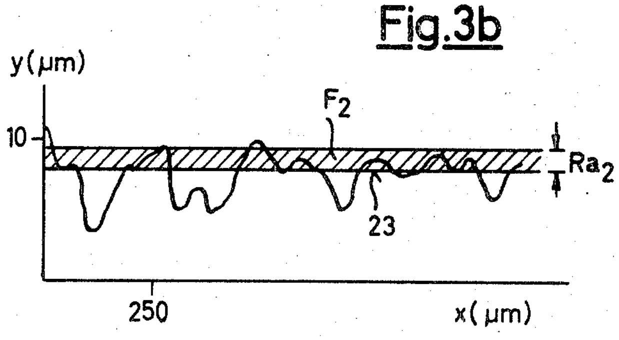
Figure 3C:
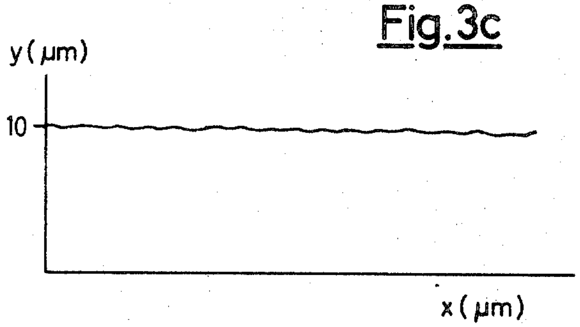

Embodiments of the invention are described below with reference to the accompanying drawings, in which FIG. 1 is a diagrammatic plan view of a cassette with pivotable tape guide levers, FIG. 2 is a perspective view of a lever shown in FIG. 1, FIG. 3*a* is a roughness graph of part of the unused guide surface of the lever shown in FIG. 2 taken along the line III—III, FIG. 3*b* is a roughness graph of part of the guide surface of the same lever after prolonged use taken along the line III—III, FIG. 3*c* is a roughness graph of part of the smooth surface of the rear side of the lever shown in FIG. 2 taken along the line III—III, FIG. 4*a* is a front view of part of the guide surface of a lever shown in FIG. 1, FIG. 4*b* is a cross-sectional view of the lever shown in FIG. 4*a*, FIG. 5*a* is a front view of part of the guide surface of another design of a lever shown in FIG. 1, and FIG. 5*b* is a cross-sectional view of the lever shown in FIG. 5*a*.

A rectangular base 1 of a cassette has in the front side wall 2 openings 3 to 5 serving to admit the magnetic heads and pressure rolls (not shown) on the recorder. Openings 6 and 7 are provided in the base 1 near the side wall 2 for admitting the capstan and tape guide pins on the recorder. Pressure pad 8 and magnetic head screening shield 8*a* are arranged behind opening 3. A magnetic tape 11 is wound on flangeless spools 9 and 10, which are rotatably mounted on the base 1, to form packs 12 and 13. The tape 11 travels between packs 12 and 13 around idler rolls 14 and 15 which are also rotatably mounted on the base 1. Pivots 18 for levers 19 and 20 serving as tape guide elements are let into the base 1 and top wall (not shown) of the cassette housing, said pivots being arranged inside the loop formed by the tape 11 and near the idler rolls 14 and 15. Levers 19 and 20 are provided with guide surfaces 21*a* and 21*b* respectively, against which the tape base, usually polyester material, practically constantly bears when it is in motion.

In an advantageous embodiment of the invention the tape guide elements, e.g. levers, and their guide surfaces are made of thermoplastic polymers or polycondensates such as polystyrene, polyvinyl chloride, nylon, polyvinyl carbazole, polyformaldehyde, polyethylene and polypropylene so that they can be manufactured by injection, extrusion or compression molding. As a result of the use of a suitable rigid plastics material the tape guide elements, particularly the guide surfaces, are substantially abrasion-resistant and yet soft enough to avoid damaging polyester of polyvinyl chloride tape base material. It is however also possible to use other non-magnetizable materials for the guide elements and guide surfaces.

It has been found, particularly when high-quality polyformaldehyde plastics material is used for the guide surface, that during operation the polyester tape base adheres to the guide surface, which results in disturbances ranging from irregular tape motion and the formation of an uneven tape pack to complete standstill of the reels. Well before this last stage is reached, wow and flutter occurs. One of the reasons for this adhesion is that the buildup of static electricity on the tape as a result of it sliding over the tape guide elements, particularly when these are made of plastics material, causes the tape to stick to the guide surface. Adhesion could only be reduced slightly by coating the guide surface with a conductive film of non-magnetizable metal.

Another reason is undoubtedly that adhesive forces are produced between the smooth surfaces of the guide surface and the tape base, these forces being the same as those which are produced when a plastics film is drawn over a smooth plastics or glass surface. Yet another reason is that wear products are produced between the guide surface and the magnetic tape which collect between the slight irregularities that are always present in the guide surface, with the result that the longer the cassette is used, the smoother the guide surface becomes, i.e. it adheres increasingly readily to the tape base as time goes by. Depending on the abrasion resistance of the materials used, these wear products may originate from the guide surface or the tape base or from both.

In accordance with the invention the guide surfaces 21*a* and 21*b* are provided with a specific surface roughness having a center line average value $R_a$ of at least 0.28μ. FIG. 2 is a perspective view of lever 20, the dotted area representing the guide surface 21a.

FIGS. 3*a*, 3*b* and 3*c* respectively show curves of parts of the guide surface 21*a* in the unused state, of the same surface after an operating period of 200 hours under normal operating conditions comprising recording, reproduction, sudden changes in the direction of tape motion, rapid rewind and fast forward wind, and of the surface of the rear side 22 of the lever 20. The measurements were taken on the line III—III in FIG. 2 with the aid of an electrical instrument employing a stylus. The irregularities in the surface were sensed with a diamond stylus whose tip had a radius of curvature of about 2μ,and the deflection of the stylus was converted into an electrical signal which was recorded on a Perth-O-Graph graphic recorder (Model ECW, manufactured by Perthen, Hanover, Germany).

The center line average value $R_a$ is shown in FIG. 3*a*. $R_a$ is the arithmetic mean of the lined areas lying above and below the center line 23, these areas being designated A*oi* and A*ui* respectively. The center line 23 has been drawn in in such a way that ΣA*oi* equals Σ A*ui*. The hatched area F, the height *y* of which is the $R_a$ value, is equal to the sum of ΣA*oi* and ΣA*ui*. In FIG. 3*a* $R_{a1}$ is about 2.2μ which corresponds to a peak-to-valley height $R_t$ of approximately 17.5μ. In FIG. 3*b* $R_{a2}$ is 1.8μ which corresponds to a peak-to-valley height $R_t$ of 14.25μ. These $R_t$ values were read off from the graph contained in German Standard Specification (DIN) 4767 of September 1970. It can be concluded from the fact that $R_{a2}$ is smaller than $R_{a1}$ that the amplitudes of the curve in FIG. 3*b*, as compared with those of the curve in FIG. 3 *a*, have been decreased by the wear products stemming from the magnetic tape 11 and/or the guide surface 21*a*. It can be seen from the course of the two curves that the guide surface 21*a* exhibits hardly any sharp peaks which could damage the tape base. Care should be taken during the manufacture of the guide elements of the invention to ensure that the elevations on the guide surfaces are substantially rounded.

For comparison purposes, FIG. 3*c* shows the curve of the smooth rear side 22 of the lever 20 which exhibits a center line average value $R_{a3}$ of approximately O.

The center line average values $R_a$ according to the invention range from about 0.85μ to about 3.15μ, corresponding to a peak-to-valley height $R_t$ of from about 7μ to about 25μ, preferably from about 1.6μ to about 3.15μ, corresponding to a peak-to-valley height $R_t$ of from about 15μ to about 25μ. All these surface roughnesses were obtained during the manufacture of the levers by injection molding or extrusion molding with the aid of suitably roughened mold surfaces. It is however also possible to produce the lever with a smooth guide surface in a conventional manner and then to roughen the guide surface mechanically by a conventional method, e.g. by sandblasting or grinding. Levers 19 and 20 preferably consist of polyformaldehyde or nylon. The magnetic tapes used in the experiments had polyester or PVC tape bases.

Apart from what has been said above, another parameter which is important is the size of the effective area of the roughened guide surface in contact with the tape base as compared with the contact area of a smooth guide surface. We have found that the effective area of the roughened guide surface in contact with the tape base can be one third to one half smaller than the contact area of a smooth guide surface of the same size. As far as the structure of the guide surface is concerned, they may be grained, i.e. provided with elevations, indentations or pores, and/or provided with grooves, particularly longitudinal grooves, arranged in an order or random manner. These elevations, indentations and grooves should be so shaped that substantially no sharp edges are formed. The guide surface shown in FIGS. 4*a* and 4*b* has two longitudinal grooves, whereas the one in FIGS. 5*a* and 5*b* has a crisscross pattern of grooves arranged at an angle to the longitudinal axis of the guide element.

We claim:

1. A tape guide element for winding tape on or off a tape pack in magnetic tape cartridges, said element being of non-magnetizable material and having a guide surface for the back of the turn of tape approaching or leaving the tape pack, said guide surface exhibiting a surface roughness with a center line average value $R_a$ of at least 0.28μ to about 3.15μ.

2. A tape guide element as claimed in claim 1, wherein the guide surface exhibits a surface roughness having a center line average value $R_a$ of from about 0.85μto about 3.15μ.

3. A tape guide element as claimed in claim 2, wherein the area of the roughened guide surface exhibiting a surface roughness having a center line average value $R_a$ of from about 0.85μ to about 3.15μ which is in contact with the tape base is one third to one half smaller than the contact area of a smooth guide surface of the same size.

4. A tape guide element as claimed in claim 1, wherein the guide surface exhibits a surface roughness having a center line average value $R_a$ of from about 1.6μ to about 3.15μ.

5. A tape guide element as claimed in claim 1, wherein the area of the roughened guide surface in contact with the tape base is one third to one half smaller than the contact area of a smooth guide surface of the same size.

6. A tape guide element as claimed in claim 1, wherein the guide surface is grained.

7. A tape guide element as claimed in claim 1, wherein the guide surface is provided with grooves, particularly longitudinal grooves.

8. A tape guide element for winding tape on or off a tape pack in magnetic tape cartridges, said element being of thermoplastic material and having a guide surface for the back of the turn of tape approaching or leaving the tape pack, said guide surface exhibiting a surface roughness with a center line average value $R_a$ of at least 0.28μ to about 3.15μ.

* * * * *